United States Patent
Zaum et al.

(10) Patent No.: US 10,915,784 B2
(45) Date of Patent: Feb. 9, 2021

(54) METHOD FOR DETECTING MAP ERRORS

(71) Applicant: Robert Bosch GmbH, Stuttgart (DE)

(72) Inventors: Daniel Zaum, Sarstedt (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/660,371

(22) Filed: Oct. 22, 2019

(65) Prior Publication Data
US 2020/0160093 A1 May 21, 2020

(30) Foreign Application Priority Data

Nov. 15, 2018 (DE) .......................... 10 2018 219 602

(51) Int. Cl.
*G06K 9/00* (2006.01)
*G06K 9/62* (2006.01)
(Continued)

(52) U.S. Cl.
CPC ............. *G06K 9/6202* (2013.01); *G06K 9/46* (2013.01); *G06T 7/74* (2017.01); *G01S 13/865* (2013.01);
(Continued)

(58) Field of Classification Search
CPC .... G05D 1/0274; G05D 1/024; G05D 1/0246; G05D 1/028; G05D 2201/0213; A61F 2002/4633; B25J 13/089; B25J 9/1664; B25J 9/1697; G01C 21/165; G01C 21/206; G01C 21/28; G01C 21/30; G01C 21/34;
(Continued)

(56) References Cited

U.S. PATENT DOCUMENTS 6,154,152 A * 11/2000 Ito .......................... G01C 21/32
340/988
9,467,660 B1 * 10/2016 Edelstein ............... G01C 21/30
(Continued)

FOREIGN PATENT DOCUMENTS

| DE | 10302671 A1 | 8/2004 |
| DE | 102005008185 A1 | 8/2006 |
| DE | 102015208345 A1 | 11/2016 |

OTHER PUBLICATIONS

Williams, et al.: "Multiple graph matching with Bayesian inference", Pattern Recognition Letters 18 (1997), pp. 1275-1281.

*Primary Examiner* — Ian L Lemieux
(74) *Attorney, Agent, or Firm* — Norton Rose Fulbright US LLP; Gerard Messina

(57) ABSTRACT

A method for detecting map errors includes the following method steps: A first and a second locating map are provided. Features detectable with the aid of a first surroundings sensor of a vehicle are recorded in the first locating map. Features detectable with the aid of a second surroundings sensor of the vehicle are recorded in the second locating map. At least one comparison feature recorded in the first and second locating maps is selected. At least one comparison variable is ascertained on the basis of a first pose of the comparison feature on the first locating map and a second pose of the comparison feature on the second locating map. A map error is established if the comparison variable exceeds a specified threshold value.

10 Claims, 3 Drawing Sheets

(51) Int. Cl.
*G06T 7/73* (2017.01)
*G06K 9/46* (2006.01)
*G01S 13/86* (2006.01)
*G01S 13/89* (2006.01)

(52) U.S. Cl.
CPC ..... *G01S 13/89* (2013.01); *G06T 2207/30244* (2013.01)

(58) Field of Classification Search
CPC . G01C 21/3476; G01C 21/3602; G01S 13/42; G01S 13/865; G01S 13/867; G01S 13/87; G01S 13/876; G01S 13/89; G01S 13/90; G01S 13/931; G01S 17/89; G01S 2013/93273; G01S 5/0252; G01S 7/412; G06K 2209/21; G06K 9/00818; G06K 9/2054; G06K 9/46; G06K 9/6256; G06T 2207/10016; G06T 2207/3008; G06T 2207/30204; G06T 2207/30241; G06T 2207/30244; G06T 2207/30252; G06T 7/66; G06T 7/73; G06T 7/74; G06T 7/75; G06F 16/2379; G06F 16/29; G06F 16/5866

See application file for complete search history.

(56) References Cited

U.S. PATENT DOCUMENTS

| | | | |
|---|---|---|---|
| 10,147,192 B2* | 12/2018 | Moteki | G06T 7/593 |
| 10,611,028 B1* | 4/2020 | Zhou | G05D 1/0246 |
| 2005/0259882 A1 | 11/2005 | Dewaele | |
| 2010/0070078 A1* | 3/2010 | Kong | G05D 1/0274 |
| | | | 700/259 |
| 2016/0282126 A1* | 9/2016 | Watts | H04W 4/029 |
| 2017/0307746 A1 | 10/2017 | Rohani et al. | |
| 2017/0357858 A1* | 12/2017 | Mendonca | G06T 7/30 |
| 2017/0370729 A1* | 12/2017 | Laur | G06F 16/29 |
| 2018/0045519 A1 | 2/2018 | Ghadiok et al. | |
| 2018/0079085 A1 | 3/2018 | Nakata et al. | |
| 2018/0188027 A1* | 7/2018 | Zhang | G01C 21/32 |
| 2018/0286072 A1* | 10/2018 | Tsai | G05D 1/0274 |
| 2019/0236797 A1* | 8/2019 | Thyagharajan | G06T 7/85 |
| 2019/0295282 A1* | 9/2019 | Smolyanskiy | G01S 13/931 |
| 2020/0047340 A1* | 2/2020 | Hong | G05B 15/02 |
| 2020/0098135 A1* | 3/2020 | Ganjineh | G06F 16/583 |
| 2020/0206927 A1* | 7/2020 | Bai | B25J 9/1666 |
| 2020/0333162 A1* | 10/2020 | Wang | G06T 7/73 |
| 2020/0334857 A1* | 10/2020 | Garud | G01C 21/30 |

* cited by examiner

METHOD FOR DETECTING MAP ERRORS

CROSS REFERENCE

The present application claims the benefit under 35 U.S.C. § 119 of German Patent Application No. DE 102018219602.8 filed on Nov. 15, 2018, which is expressly incorporated herein by reference in its entirety.

FIELD

The present invention relates to a method for detecting map errors.

BACKGROUND INFORMATION

Present vehicle systems are distinguished by a continuously increasing degree of automation. One condition required for carrying out automated driving actions is locating a vehicle. Map-based approaches are frequently followed for locating a vehicle. Multiple locating maps may be used for improved locating.

A method for checking digital road data is described in German Patent Application No. DE 10 2005 008 185 A1, in which a map matching method is carried out on the basis of a present vehicle position and stored digital road data.

One object of the present invention is to specify a method for detecting map errors. This object may be achieved by an example method for detecting map errors in accordance with the present invention. Advantageous refinements of the present invention are described herein.

In accordance with the present invention, an example method for detecting map errors includes the following method steps: A first and a second locating map are provided. Features detectable with the aid of a first surroundings sensor of a vehicle are recorded in the first locating map. Features detectable with the aid of a second surroundings sensor of the vehicle are recorded in the second locating map. At least one comparison feature recorded in the first and second locating maps is selected. At least one comparison variable is ascertained on the basis of a first pose of the comparison feature on the first locating map and a second pose of the comparison feature on the second locating map. A map error is established if the comparison variable exceeds an established threshold value.

A comparison between the first locating map and the second locating map is thus carried out by the method. An evaluation of the agreement of the locating maps is carried out on the basis of the established threshold value for the comparison variable. The method may advantageously enable more reliable locating of a vehicle if a map error is detected. The method may thus also increase the reliability when carrying out automated driving actions.

In one specific embodiment, the ascertainment of the comparison variable includes the following method steps: A transformation between the first pose and the second pose is ascertained. A difference between the transformation and the unit matrix is ascertained. A matrix is thus ascertained as a comparison variable. In this case, a threshold value may be established for each component of the difference matrix. In addition to a translation, a rotation may advantageously also be described with the aid of the transformation.

In one specific embodiment, a distance between the first pose and the second pose is ascertained as a comparison variable. The method may advantageously be carried out particularly simply if a distance is ascertained as a comparison variable.

In one specific embodiment, a plurality of comparison features recorded in the first and second locating maps is selected. Extended sections of the locating maps may advantageously be examined for map errors by the selection of the plurality of comparison features.

In one specific embodiment, at least one comparison variable is ascertained with respect to each comparison feature. A local dependence of map errors may advantageously be taken into consideration if at least one comparison variable is ascertained for each comparison feature.

In one specific embodiment, a dispersion measure with respect to distances between first poses of the comparison features on the first locating map and second poses of the comparison features on the second locating map is ascertained as a comparison variable.

In one specific embodiment, the method includes the following further method step: The first and the second locating map are released for locating if no map errors are established. In this way, advantageously, only error-free locating maps may be used for locating.

In one specific embodiment, the method includes the following further method step: One section of each of the first and the second locating maps is excluded from locating if a map error is established. Sections of the first and the second locating maps inconsistent with one another are advantageously excluded from the locating in this way. Locating errors may thus be avoided.

In one specific embodiment, the method includes the following further method step: An erroneous section of one of the locating maps is identified and excluded from locating if a map error is established. The map error is associated with the locating map whose creation point in time or updating point in time is prior to the creation point in time or updating point in time of the other locating map. Advantageously, only the erroneous section of one of the locating maps may be excluded from the locating. The error-free section of the other locating map, in contrast, may be released for locating. At least one of the locating maps may thus be completely available for the locating.

In one specific embodiment, a third locating map is provided. Features detectable with the aid of a third surroundings sensor of the vehicle and the comparison feature are recorded in the third locating map. The comparison variable is ascertained in pairs between the locating maps. An additional comparison of the first and second locating maps to the third locating map advantageously enables an established map error to be associated with one of the locating maps, i.e., enables the map error to be identified.

The above-described properties, features, and advantages of the present invention and the manner in which they are achieved are clearer and more comprehensible in conjunction with the following description of the exemplary embodiments, which are explained in greater detail in conjunction with the figures.

DETAILED DESCRIPTION OF EXAMPLE EMBODIMENTS

Figure 1:
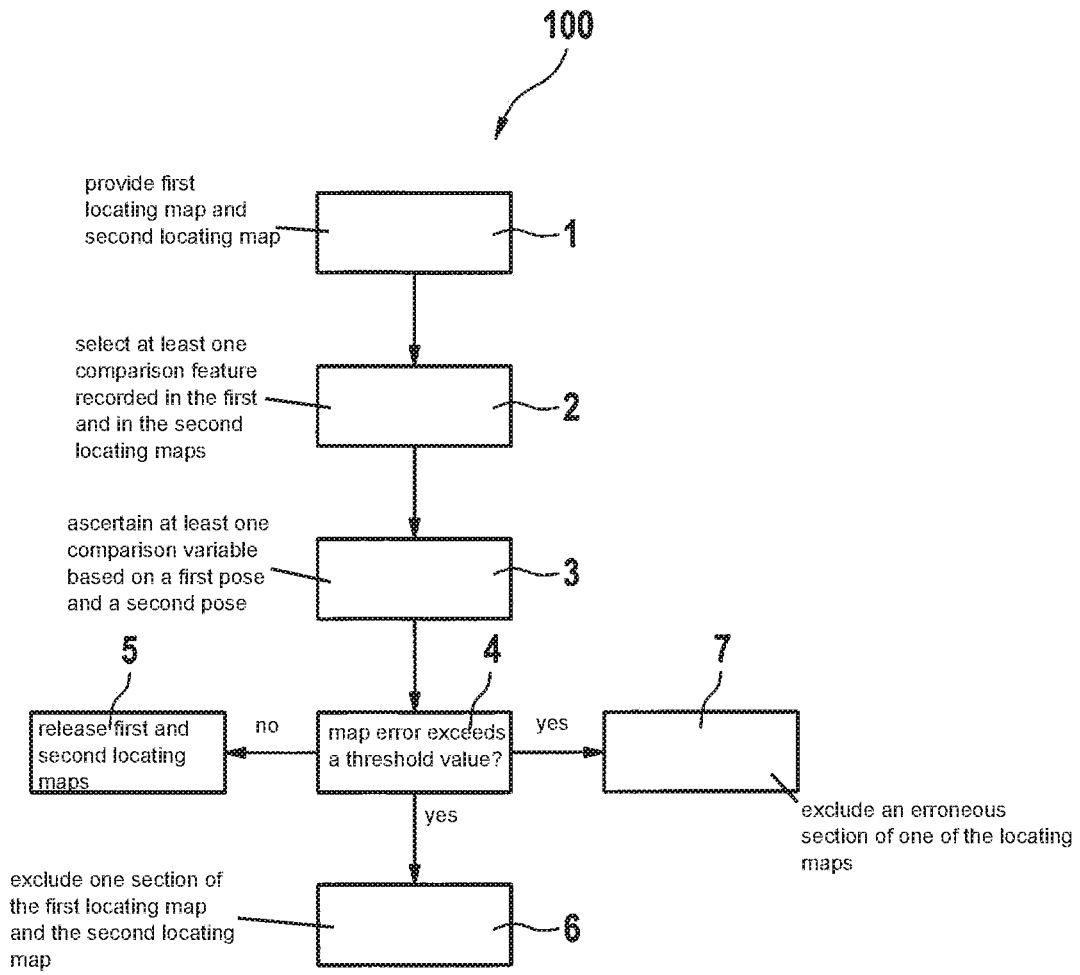
FIG. 1 schematically shows method steps of a method for detecting map errors.

FIG. 1 schematically shows method steps 1, 2, 3, 4, 5, 6, 7 of a method 100 for detecting map errors.

In a first method step 1, a first locating map and a second locating map are provided. Features detectable with the aid of a first surroundings sensor of a vehicle are recorded in the first locating map. Features detectable with the aid of a second surroundings sensor of the vehicle are recorded in the second locating map. The features may be, for example, buildings, guard rails, curbs, signs, and trees. Other features may also be recorded in the locating maps.

Locating maps may be used for locating a vehicle. In the case of a multimodal approach, the locating of a vehicle is carried out on the basis of multiple locating maps. A reliability of the locating may thus be enhanced. Such an approach is typically used for locating automated vehicles. Automated vehicles include an automatic driving function.

A locating map may be designed, for example, as a radar locating map, a LIDAR locating map, or a video locating map. For example, the first locating map may be designed as a radar locating map, while the second locating map is designed as a LIDAR locating map. However, other combinations are also possible. The first and the second surroundings sensors of the vehicle may accordingly be designed as a radar sensor unit, as a LIDAR sensor unit, or as a camera.

A radar locating map contains radar signatures of surroundings represented by the radar locating map. To locate the vehicle on the radar locating map, features in surroundings of the vehicle which are recorded in the radar locating map may be detected with the aid of the radar sensor unit of the vehicle. By determining a pose of the vehicle in relation to at least one detected feature, a pose of the vehicle on the radar locating map may be ascertained, whereby the vehicle is located. A pose includes a position and an orientation.

The LIDAR locating map and the video locating map may be used similarly for locating the vehicle. A LIDAR locating map contains LIDAR signatures of the surroundings represented by the LIDAR locating map while a video locating map contains images of the surroundings represented by the video locating map.

Locating maps which represent the same surroundings may differ from one another. Differences between locating maps may exist, for example, if there is a change in the surroundings between creation points in times or updating points in time of two locating maps. A change of the surroundings may be, for example, a changed road characteristic. It may thus be that, for example, guard rails, curbs, signs, trees, and other features which are detectable by the surroundings sensors of the vehicle have been added as new features, modified, or removed. If a locating map is only created after such changes or if an already existing locating map is not updated, this locating map thus includes map errors. For this reason, in the multimodal locating approach, a comparison of multiple locating maps is necessary. The method for detecting map errors is used for this purpose.

In a second method step 2, at least one comparison feature recorded in the first and in the second locating map is selected. A comparison feature recorded in both locating maps is thus selected to carry out a comparison between the first and the second locating maps. This feature is detectable with the aid of the first and the second surroundings sensors of the vehicle. If, for example, the first locating map is designed as a radar locating map and the second locating map is designed as a LIDAR locating map, the comparison feature may be, for example, a guard rail recorded in both locating maps. If, for example, the first locating map is designed as a LIDAR locating map and the second locating map is designed as a video locating map, the comparison feature may be, for example, a lane marking recorded in both locating maps.

A plurality of comparison features recorded in the first locating map and in the second locating map may also be selected. Extended sections of the locating maps may be examined for map errors by way of the selection of the plurality of the comparison feature. The comparison feature may also include a group of features. For example, the comparison feature may include a group of signs or a group of trees.

In a third method step 3, at least one comparison variable is ascertained on the basis of a first pose of the comparison feature on the first locating map and a second pose of the comparison feature on the second locating map. A distance between the first pose and the second pose may be ascertained as a comparison variable, for example. If the comparison feature includes a group of features, a Hausdorff distance between the comparison feature on the first locating map and the comparison feature on the second locating map may thus be ascertained. The ascertainment of a Hausdorff distance may make it possible, for example, to detect that a feature is absent in one of the locating maps, or is formed differently.

Alternatively, the ascertainment of the comparison variable may include an ascertainment of a transformation between the first pose and the second pose and an ascertainment of a difference between the transformation and the unit matrix. The transformation may include, for example, a translation and/or a rotation. This enables an extended object to be selected as a comparison feature and its orientation on the locating maps to be taken into consideration. An orientation may also be relevant if the comparison feature includes a group of features.

If a plurality of comparison features is selected, at least one comparison variable may be ascertained with respect to each comparison feature. If at least one comparison variable is ascertained for each comparison feature, a local dependence of map errors may advantageously be taken into consideration. Alternatively, only one comparison variable may also be ascertained in the case of a selected plurality of comparison features. For example, a dispersion measure with respect to distances between first poses of the comparison features on the first locating map and second poses of the comparison features on the second locating map may be ascertained. For example, a mean square deviation may be ascertained with respect to the distances between first and second poses. These may also be Hausdorff distances. It is advantageously possible due to the ascertainment of the dispersion measure to detect a changed geometric arrangement of the comparison feature on one of the locating maps.

In a fourth method step 4, a map error is established if the comparison variable exceeds an established threshold value. If the difference between the transformation and the unit matrix is ascertained as a comparison variable, a threshold value may thus be established, for example, for each component of the difference matrix.

It is also possible to ascertain a plurality of comparison variables to detect map errors. For example, method 100 may include the ascertainment of a transformation as a first comparison variable and the ascertainment of a dispersion measure as a second comparison variable.

In an optional fifth method step 5, the first and the second locating map are released for locating if no map errors are established. Only error-free locating maps may thus be used for locating the vehicle.

In an optional sixth method step 6, one section of the first locating map and the second locating map is excluded in each case from locating if a map error is established. Thus in each case one section of the first locating map and one section of the second locating map are excluded from the locating, since the map error may not be associated unambiguously to one locating map. It may only be established that a map error is present and/or the sections of the locating maps are inconsistent.

The sections of the locating maps excluded from the locating may be specified surroundings of the comparison feature. However, they may also be sections within which a plurality of comparison features were selected to examine these sections for map errors. These may also be sections within which at least one comparison feature including a group of features was selected to examine these sections for map errors. The entire first locating map and the entire second locating map may also be excluded from the locating. If sections of the first and the second locating map are excluded from the locating, the remaining areas of the locating maps may thus be released for the locating.

In an optional seventh method step 7, an erroneous section of one of the locating maps is identified and excluded from locating if a map error is established. In this case, not only the inconsistency of the locating maps is thus established, but rather the map error is associated with one of the locating maps. This may take place in various ways.

A first option for associating a map error with the first or second locating map is to use a third locating map. The third locating map is initially provided. Features detectable with the aid of a third surroundings sensor of the vehicle and the comparison feature are recorded in the third locating map. The comparison variable is ascertained in pairs between the locating maps. If a map error is present which was established upon the comparison of the first and the second locating maps, it may be inferred from the comparison of the first locating map to the third locating map and the comparison of the second locating map to the third locating map that a map error may be associated with either the first locating map or the second locating map.

A second option for associating a map error with the first or second locating map is that the map error is associated with the locating map whose creation point in time or updating point in time is prior to the creation point in time or updating point in time of the other locating map. For example, it may be that the first locating map has been created by a first supplier and is updated at specified time intervals. A second producer has created the second locating map but may not update it regularly. The method offers the option of identifying map errors of the second locating map. Since the second locating map has not been updated, an established map error may be associated with the second locating map. The second producer thus has the option of correcting the second locating map.

If the erroneous section of one of the locating maps is excluded from the locating, the error-free corresponding section of the other locating map may be released for the locating. At least one of the locating maps may thus be completely available for the locating.

The method for detecting map errors may enable more reliable locating of the vehicle. If a map error is detected, there is thus also the option of mapping a locating map again in an erroneous section. The mapping may take place in that a vehicle travels the surroundings represented by the erroneous section and records corresponding signatures with the aid of a surroundings sensor.

The method may be carried out in a processing center, for example. The method may also be carried out by a system of a vehicle, however. The method may be carried out, for example, by a system of an automated vehicle in a locating mode of the automated vehicle during operation with the aid of the automatic driving function. The method may also enhance the safety during operation with the aid of the automatic driving function. For example, a map error may be detected during operation with the aid of the automatic driving function and a safety measure may thereupon be initiated. For example, an occupant of the automated vehicle may be prompted to manually control the vehicle if a map error is established. In addition, a speed of the automated vehicle may also be reduced if a map error is detected.

Figure 2:
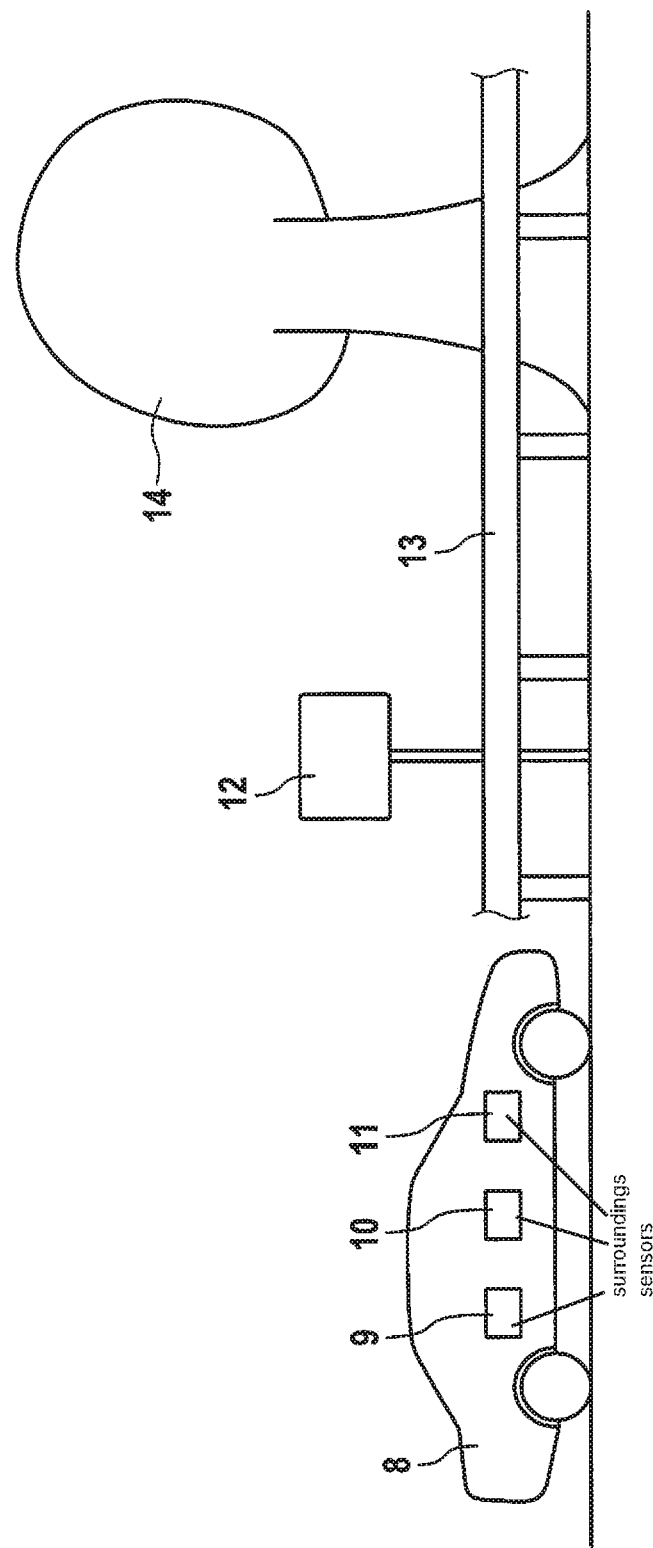
FIG. 2 schematically shows a vehicle including surroundings sensors and features detectable with the aid of the surroundings sensors.

FIG. 2 shows a vehicle 8 including surroundings sensors 9, 10, 11.

By way of example, FIG. 2 shows that vehicle 8 includes three surroundings sensors 9, 10, 11. Vehicle 8 may also include a different number of surroundings sensors 9, 10, 11. A first surroundings sensor 9 may be designed, for example, as a radar sensor unit. A second surroundings sensor 10 may be designed, for example, as a LIDAR sensor unit. A third surroundings sensor 11 may be designed, for example, as a camera.

Surroundings sensors 9, 10, 11 are designed to detect features recorded in the locating maps. FIG. 2 shows by way of example several features 12, 13, 14 which are detectable with the aid of surroundings sensors 9, 10, 11, a sign 12, a guard rail 13, and a tree 14 being shown by way of example. The locating of vehicle 8 is carried out by detecting at least one feature 12, 13, 14 contained in a locating map and determining a pose of vehicle 8 in relation thereto.

Figure 3:
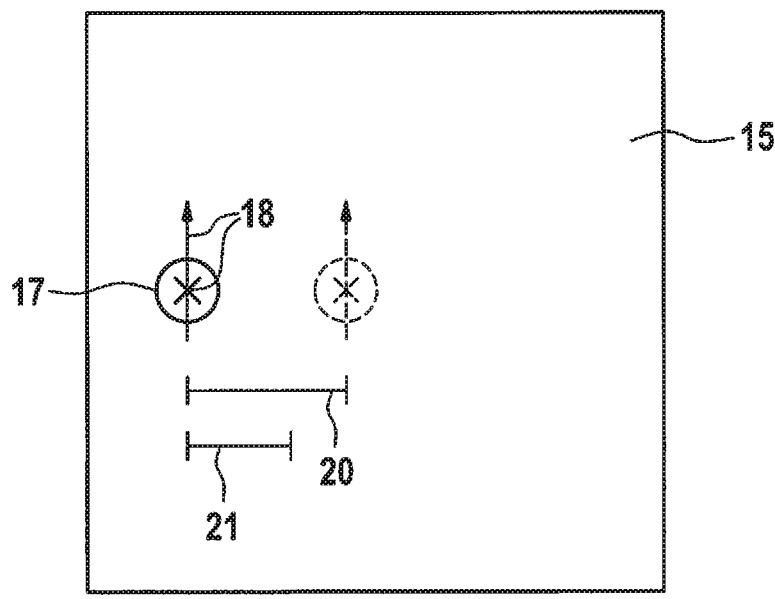
FIG. 3 schematically shows an illustration of the method according to one specific embodiment.
Figure 3:
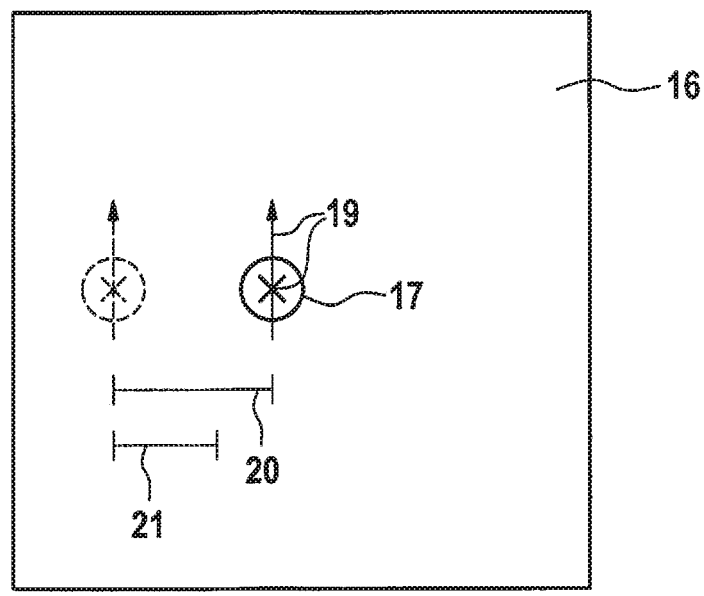

FIG. 3 illustrates method 100 for detecting map errors according to one specific embodiment.

In FIG. 3, provided first locating map 15 and provided second locating map 16 are shown. For the sake of simplicity, only selected comparison feature 17 is shown in locating maps 15, 16. Other features recorded in locating maps 15, 16 are not shown. Comparison feature 17 is indicated with the aid of a circle in FIG. 3. Comparison feature 17 includes a first pose 18 on first locating map 15 and a second pose 19 on second locating map 16. Poses 18, 19 are each indicated with the aid of a cross and an arrow. The crosses represent the position of comparison feature 17, while the arrows illustrate orientations of comparison feature 17.

For example, the orientations of comparison feature 17 are identical in the first and second locating map. The positions of comparison feature 17 are, for example, such that they do not agree with one another, however. To illustrate this, comparison feature 17 is shown twice in first locating map 15. A dotted representation of comparison feature 17 shows comparison feature 17 at the position of second pose 19. Accordingly, FIG. 3 shows on second locating map 16 a dotted representation of comparison feature 17 at the position of first pose 18.

A distance between first pose 18 and second pose 19 is ascertained by way of example as comparison variable 20. To establish whether a map error is present, it is checked whether comparison variable 20 exceeds specified threshold value 21. In FIG. 3, threshold value 21 is selected by way of example for comparison variable 20 in such a way that comparison variable 20 exceeds the threshold value. In the exemplary scenario, a map error is thus present.

The map error may be associated with one of locating maps 15, 16 if, for example, first locating map 15 is additionally compared to the third locating map and second locating map 16 is compared to the third locating map. If, for example, first pose 18 of comparison feature 17 on first locating map 15 agrees with a third pose of comparison feature 17 on the third locating map, the map error may thus be associated with second locating map 16.

What is claimed is:

1. A method for detecting map errors, comprising the following steps:
   providing a first and a second locating map, features detectable using a first surroundings sensor of a vehicle being recorded in the first locating map, and features detectable using a second surroundings sensor of the vehicle being recorded in the second locating map;
   selecting at least one comparison feature recorded in the first locating map and the second locating map;
   ascertaining at least one comparison variable based on a first pose of the comparison feature on the first locating map and a second pose of the comparison feature on the second locating map; and
   establishing a map error when the comparison variable exceeds a specified threshold value.

2. The method as recited in claim 1, wherein the ascertainment of the comparison variable includes the following method steps:
   ascertaining a transformation between the first pose and the second pose; and
   ascertaining a difference between the transformation and a unit matrix.

3. The method as recited in claim 1, wherein a distance between the first pose and the second pose is ascertained as the comparison variable.

4. The method as recited in claim 1, wherein a plurality of comparison features recorded in the first locating map and the second locating map is selected.

5. The method as recited in claim 4, wherein at least one comparison variable is ascertained with respect to each comparison feature.

6. The method as recited in claim 4, wherein a dispersion measure with respect to distances between first poses of the comparison features on the first locating map and second poses of the comparison features on the second locating map is ascertained as a comparison variable.

7. The method as recited in claim 1, further comprising the following step:
   releasing the first locating map and the second locating map for locating when no map error is established.

8. The method as recited in claim 1, further comprising the following step:
   excluding one section of each of the first locating map and the second locating map from locating when a map error is established.

9. The method as recited in claim 1, further comprising the following step:
   identifying and excluding an erroneous section of one of the first locating map or the second locating map from locating when a map error is established.

10. The method as recited in claim 9, wherein a third locating map is provided, features detectable using a third surroundings sensor of the vehicle and the comparison feature being recorded in the third locating map, the comparison variable being ascertained in pairs between the locating maps.

* * * * *